United States Patent
Foster et al.

(10) Patent No.: US 10,448,555 B2
(45) Date of Patent: Oct. 22, 2019

(54) SYSTEM AND METHOD FOR SCOUTING VEHICLE MAPPING

(71) Applicants: CNH Industrial America LLC, New Holland, PA (US); Autonomous Solutions, Inc., Mendon, UT (US)

(72) Inventors: Christopher A. Foster, Mohnton, PA (US); John H. Posselius, Ephrata, PA (US); Bret Todd Turpin, Wellsville, UT (US); Daniel John Morwood, Petersboro, UT (US); Michael G. Hornberger, Weston, ID (US); Erik E. Veikle, Lititz, PA (US)

(73) Assignees: CNH Industrial America LLC, New Holland, PA (US); Autonomous Solutions, Inc., Mendon, UT (US)

( * ) Notice: Subject to any disclaimer, the term of this patent is extended or adjusted under 35 U.S.C. 154(b) by 9 days.

(21) Appl. No.: 15/167,590

(22) Filed: May 27, 2016

(65) Prior Publication Data
US 2017/0339820 A1 Nov. 30, 2017

(51) Int. Cl.
*A01B 69/00* (2006.01)
*G01C 21/16* (2006.01)
*G01C 21/20* (2006.01)
*G05D 1/00* (2006.01)
*G05D 1/02* (2006.01)
(Continued)

(52) U.S. Cl.
CPC ............ *A01B 69/007* (2013.01); *G01C 21/16* (2013.01); *G01C 21/165* (2013.01); *G01C 21/20* (2013.01); *G01C 21/32* (2013.01); *G05D 1/0088* (2013.01); *G05D 1/0219* (2013.01); *G05D 1/0276* (2013.01); *G07C 5/008* (2013.01); *G07C 5/02* (2013.01); *G09B 29/00* (2013.01); *G09B 29/007* (2013.01); *G09B 29/106* (2013.01); *A01B 69/00* (2013.01); *A01B 79/005* (2013.01)

(58) Field of Classification Search
CPC ...... A01B 69/007; G01C 21/16; G01C 21/20; G05D 1/0088; G05D 1/0219; G05D 1/0276; G07C 5/008; G07C 5/02
See application file for complete search history.

(56) References Cited

U.S. PATENT DOCUMENTS 5,155,683 A 10/1992 Rahim
5,159,991 A 11/1992 Tsuyama et al.
(Continued)

OTHER PUBLICATIONS

PCT Notification of Transmittal of The International Search Report and The Written Opinion of the International Searching Authority, or the Declaration; dated Oct. 2, 2017.

*Primary Examiner* — Aaron L Troost
(74) *Attorney, Agent, or Firm* — Rebecca L. Henkel; Rickard K. DeMille

(57) ABSTRACT

A system includes a scouting vehicle. The scouting vehicle includes a spatial location system configured to derive a geographic position of the scouting vehicle. The scouting vehicle further includes a computing device communicatively coupled to the spatial location system and to a communication system, the computing device comprising a processor configured to create a shape on a map based on a drive of the scouting vehicle. The scouting vehicle also includes the communication system configured to transmit the geographic position, a recording of the drive, the shape, or a combination thereof, to a base station.

20 Claims, 5 Drawing Sheets

(51) Int. Cl.
*G07C 5/00* (2006.01)
*G07C 5/02* (2006.01)
*G01C 21/32* (2006.01)
*G09B 29/00* (2006.01)
*G09B 29/10* (2006.01)
*A01B 79/00* (2006.01)

(56) References Cited

U.S. PATENT DOCUMENTS

| | | | |
|---|---|---|---|
| 5,343,206 A | 8/1994 | Ansaldi et al. | |
| 5,646,844 A * | 7/1997 | Gudat | E01C 19/004 |
| | | | 701/409 |
| 5,923,270 A * | 7/1999 | Sampo | A01B 69/008 |
| | | | 180/6.7 |
| 6,119,976 A | 9/2000 | Rogers | |
| 6,236,916 B1 * | 5/2001 | Staub | A01B 69/008 |
| | | | 701/23 |
| 6,712,312 B1 | 3/2004 | Kucik | |
| 7,039,367 B1 | 5/2006 | Kucik | |
| 7,072,764 B2 | 7/2006 | Donath et al. | |
| 7,159,954 B2 | 1/2007 | Goebeis et al. | |
| 7,272,474 B1 | 9/2007 | Stentz et al. | |
| 7,584,020 B2 | 9/2009 | Bruemmer et al. | |
| 8,073,609 B2 | 12/2011 | Koch | |
| 8,140,239 B2 | 3/2012 | Stratton et al. | |
| 8,180,547 B2 | 5/2012 | Prasad et al. | |
| 8,260,544 B2 | 9/2012 | Kawa | |
| 8,508,527 B2 | 8/2013 | Woo-Yeon et al. | |
| 8,565,958 B1 | 10/2013 | Montemerlo et al. | |
| 8,577,538 B2 | 11/2013 | Raymond et al. | |
| 8,600,621 B2 | 12/2013 | Callaway et al. | |
| 8,768,548 B2 | 7/2014 | Thielman | |
| 8,855,846 B2 | 10/2014 | Grzywna | |
| 8,909,451 B2 | 12/2014 | Kinoshita et al. | |
| 9,145,139 B2 | 9/2015 | Ferguson et al. | |
| 2006/0178823 A1 * | 8/2006 | Eglington | A01B 69/007 |
| | | | 701/414 |
| 2009/0228166 A1 * | 9/2009 | Durkos | G05D 1/0219 |
| | | | 701/26 |
| 2009/0278839 A1 | 11/2009 | Geis et al. | |
| 2010/0141518 A1 | 6/2010 | Hersey et al. | |
| 2010/0274434 A1 * | 10/2010 | Donnelli | G08G 1/20 |
| | | | 701/31.4 |
| 2012/0086598 A1 * | 4/2012 | Aghili | G01S 19/43 |
| | | | 342/357.25 |
| 2012/0174445 A1 * | 7/2012 | Jones | A01B 69/007 |
| | | | 37/197 |
| 2014/0070019 A1 | 3/2014 | Chiocco et al. | |
| 2014/0278067 A1 | 9/2014 | Gordon et al. | |
| 2014/0316614 A1 | 10/2014 | Newman | |
| 2015/0163993 A1 | 6/2015 | Pettersson | |
| 2015/0298786 A1 | 10/2015 | Stigler et al. | |
| 2015/0319913 A1 * | 11/2015 | Foster | A01B 69/00 |
| | | | 701/26 |
| 2016/0091898 A1 * | 3/2016 | Booher | G05D 1/0274 |
| | | | 701/26 |
| 2016/0157275 A1 * | 6/2016 | Matthews | H04W 76/10 |
| | | | 701/2 |
| 2017/0094989 A1 | 4/2017 | Zanetti | |

* cited by examiner

US 10,448,555 B2

SYSTEM AND METHOD FOR SCOUTING VEHICLE MAPPING

BACKGROUND

The invention relates generally to a scouting vehicle system for mapping applications.

Off-road vehicles, such as agricultural tractors may be operated in fields having a variety of soil conditions and obstacles. For example, an autonomous vehicle such as a tractor may be driven through a field having soft soil (e.g., due to a high moisture content of the soil), around ponds, in proximity to human structures and boundaries (e.g., fences, barns), and so on. Generally, the autonomous vehicle may be provided a map that may be used by the autonomous vehicle to follow certain paths and to avoid certain terrain features. While the autonomous vehicle may successfully traverse a field while applying a low or medium resolution (e.g., having a low or medium level of mapping detail) map, higher resolution maps may improve driving paths and workflow. As a result, the yield from crops located within higher resolution maps may be increased. In addition, a higher degree of mapping resolution may improve drive times and enhance operational efficiency.

BRIEF DESCRIPTION

In one embodiment, a system includes a scouting vehicle. The scouting vehicle includes a spatial location system configured to derive a geographic position of the scouting vehicle. The scouting vehicle further includes a computing device communicatively coupled to the spatial location system and to a communication system, the computing device comprising a processor configured to create a shape on a map based on a drive of the scouting vehicle. The scouting vehicle also includes the communication system configured to transmit the geographic position, a recording of the drive, the shape, or a combination thereof, to a base station.

In another embodiment, non-transitory, computer readable medium comprise instructions that when executed by a processor cause the processor to present a start control on a display and to present a stop control on the display. The instructions when executed by the processor further cause the processor to start recording a drive of a scouting vehicle when the start control is activated in the scouting vehicle. The instructions when executed by the processor additionally cause the processor to continuously record a plurality of positions of the scouting vehicle as the scouting vehicle is driven around an area and to display the plurality of positions as a shape on a map in the display. The instructions when executed by the processor also cause the processor to stop recording of the drive when a stop control is activated in the scouting vehicle and to transmit the shape, the plurality of positions, or a combination thereof, to a base station.

In a further embodiment, a method includes presenting a start control on a display and presenting a stop control on the display. The method also includes starting a recording of a drive of a scouting vehicle when the start control is activated in the scouting vehicle and continuously recording a plurality of positions of the scouting vehicle as the scouting vehicle is driven around an area. The method additionally includes displaying the plurality of positions as a shape on a map in the display and stopping the recording of the drive when a stop control is activated in the scouting vehicle. The method further includes transmitting the shape, the plurality of positions, or a combination thereof, to a base station.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Certain agricultural and other operations (mining, construction, and the like) may use an unmanned and/or manned vehicle such as a tractor or other vehicle. For agricultural operations, the vehicle may tow or include an agricultural implement such as a planter, seeder, fertilizer, and so on. In operations, the vehicle uses a map suitable for defining field boundaries, driving paths, and the like. The vehicle then may autonomously operate based on map data, and/or a human may operate the vehicle based on the map data. While map data may be gathered, for example, from a survey map, it may be beneficial to provide for techniques that may create and/or update a map based on field data. Accordingly, the techniques described herein include a scouting vehicle that may be in communication with a control center and that may be driven around a desired mapping area to create and/or update a map of the mapping area.

The scouting vehicle may be used concurrently with operations of the unmanned and/or manned vehicle. Indeed, while the unmanned and/or manned vehicle is operating on a first section of a field, the scouting vehicle may map a second section of the field, thus improving agricultural operations efficiency. The scouting vehicle includes a computing system communicatively coupled with a base station. The computing system may include a global position system (GPS) suitable for tracking a geographic position of the scouting vehicle while in motion or while stationary. The computing system may also include an inertial measurement unit (IMU) useful in using inertial measurements, such as specific force, angular rate, and/or magnetic field changes. The scout vehicle's computing system may be used to record driving position of the scouting vehicle as well as to annotate or otherwise "mark up" various terrain features, including structures, ponds, fencing, loose soil, and the like, while the scouting vehicle is maneuvering in the field. Geographic position and/or field observations may then be communicated to the base station, which may create and/or update a map of the field. The base station may then communicate the new and/or updated map to a manned and/or autonomous vehicle, such as a manned and/or autonomous tractor, thus improving farming operations. In this manner, a more accurate map may be provided, in a more efficient manner.

Figure 1:
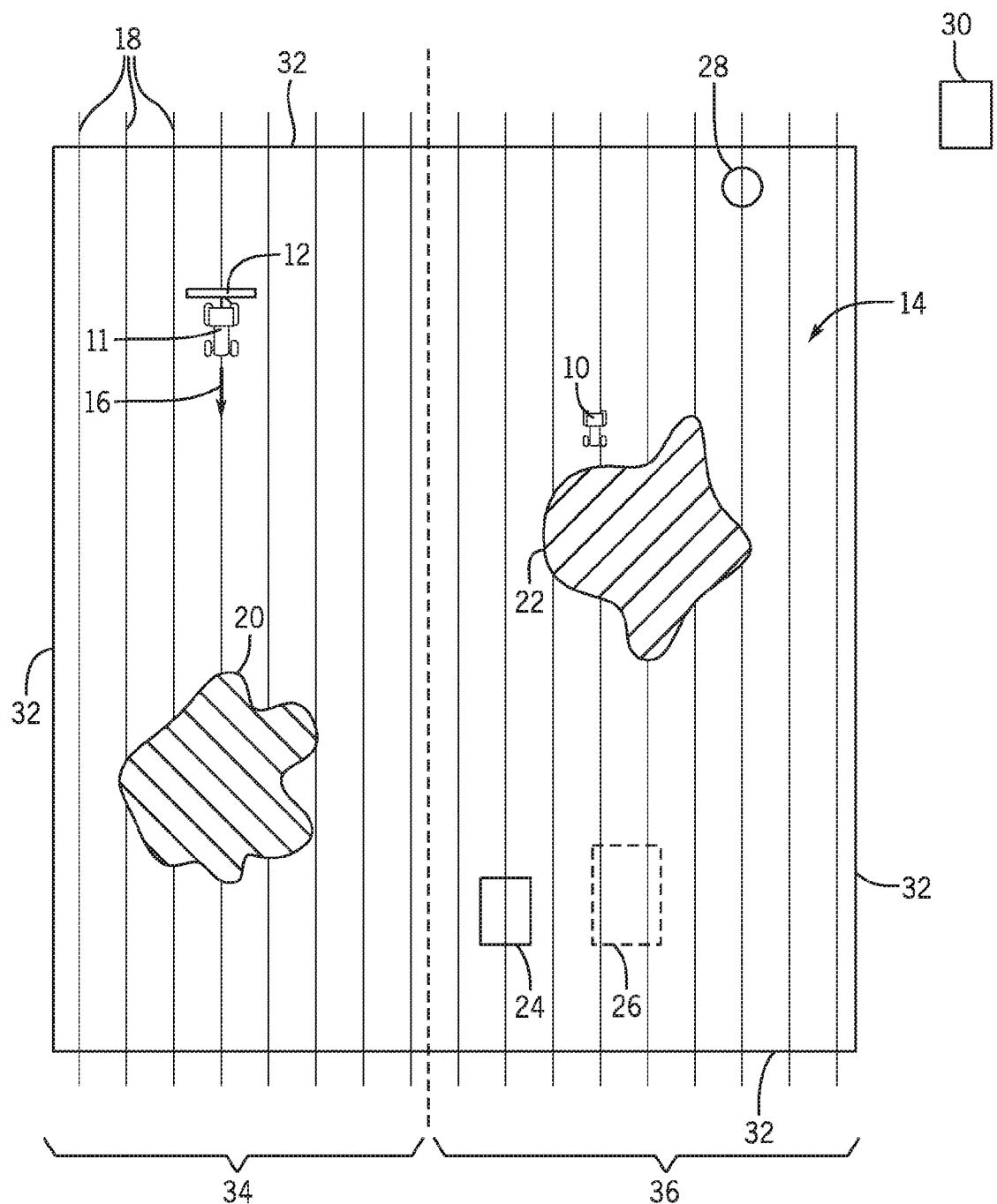
FIG. 1 is a schematic diagram of an embodiment of an scouting vehicle and an agricultural vehicle within an agricultural field.

Turning now to FIG. 1, the figure is a schematic diagram of an embodiment of a scouting vehicle 10 and a tractor 11 (autonomous and/or manned tractor) towing an agricultural implement 12 within an agricultural field 14. While in the depicted embodiment, the tractor 11 and the agricultural implement 12 are shown operating in conjunction with the scouting vehicle 10, in other embodiments, the scouting vehicle 10 may be used by itself, for example, to provide for or update a map of the field 14.

The tractor 11 or other prime mover is configured to tow the agricultural implement 12 throughout the field 14 along a direction of travel 16. In certain embodiments, the tractor 11 is directed (e.g., via an operator or an automated system) to traverse the field along substantially parallel rows 18. However, it should be appreciated that the tractor 11 may be directed to traverse the field along other routes (e.g., along a spiral path, etc.) in alternative embodiments. As will be appreciated, the agricultural implement 12 may be any suitable implement for performing agricultural operations throughout the field 14. For example, in certain embodiments, the agricultural implement 12 may be a tillage tool, a fertilizer application tool, a seeding or planting tool, or a harvesting tool, among others. While the agricultural implement 12 is towed by the tractor 11 in the illustrated embodiment, it should be appreciated that in alternative embodiments, the agricultural implement may be integrated within the tractor 11. It should be noted that the techniques describe herein may be used for operations other than agricultural operations. For example, mining operations, construction operations, automotive operations, and so on. While the description herein refers to the vehicle 11 as a tractor, it is to be understood the vehicle 11 may be a mining vehicle, a construction vehicle, a passenger vehicle, and the like.

As the tractor 11 and the agricultural implement 12 traverse the field, the tractor 11 and the agricultural implement 12 may encounter various field and/or soil conditions, as well as certain structures. Such field and/or soil conditions and structures may be defined as features for purposes of the description herein. For example, the tractor 11 and the agricultural implement 12 may encounter features such as a pond 20, a tree stand 22, a building or other standing structure 24, fencing 26, points of interest 28, and so on. The points of interest 28 may include water pumps, above ground fixed or movable equipment (e.g. irrigation equipment, planting equipment), and so on. In certain embodiments, the tractor 11 is configured to operate autonomously (e.g., without an operator present in the cab of the off-road vehicle). Accordingly, an automatic system may direct the tractor 11 and agricultural implement 12 throughout the field without direct control by an operator, for example via a map.

In such embodiments, the tractor 11 is configured to communicate with a base station 30. As discussed in detail below, the base station 30 may include a map suitable for navigating the field 14. That is, the map may include a field boundary 32, as well as the various features in the field, such as the pond 20, the tree stand 22, the building or other standing structure 24, the fencing 26, wet areas of the field 14 to be avoided, soft areas of the field to be avoided, field drainage areas that may not be planted but that may still be accessible to be driven over, the points of interest 28, and so on. While it may be possible to use satellite imagery and/or a survey map, the techniques described herein provide for an up-to-date map by using the scout vehicle 10. More specifically, the scout vehicle 10 may incorporate certain systems that may then be used to create and/or update the map as the scout vehicle 10 is driven in or around the field 14, as further described below.

In one embodiment, the scout vehicle 10 is communicatively coupled to the base station 30. During mapping operations, the scout vehicle 10 may then provide for updates to the base station 30, including mapping new fields 14, adding features to a previously mapped field 14, updating features from the mapped field 14, and/or deleting certain features from the mapped field 14. As mentioned earlier, the scout vehicle 10 may be used concurrently with the tractor 11. In some embodiments, the field 14 may be divided into sections, for example, sections 34, 36. Section 34 may be previously mapped, while section 36 may yet be mapped. As the tractor 11 operates on section 34, the scouting vehicle 10 may concurrently map section 36. This concurrent use of resources may additionally improve efficiency of operations, improve mapping of the field 14, and enhance economic value of the farming equipment 11, 12. In further embodiments, the tractor 11 may be substantially manually controlled. That is, an operator may be located within a cab of the tractor 11, and the operator may manually steer the tractor 11 throughout the field 14. In such embodiments, the operator may refer to the map created and/or updated by the scouting vehicle 10 in order to better navigate the field 14.

Figure 2:
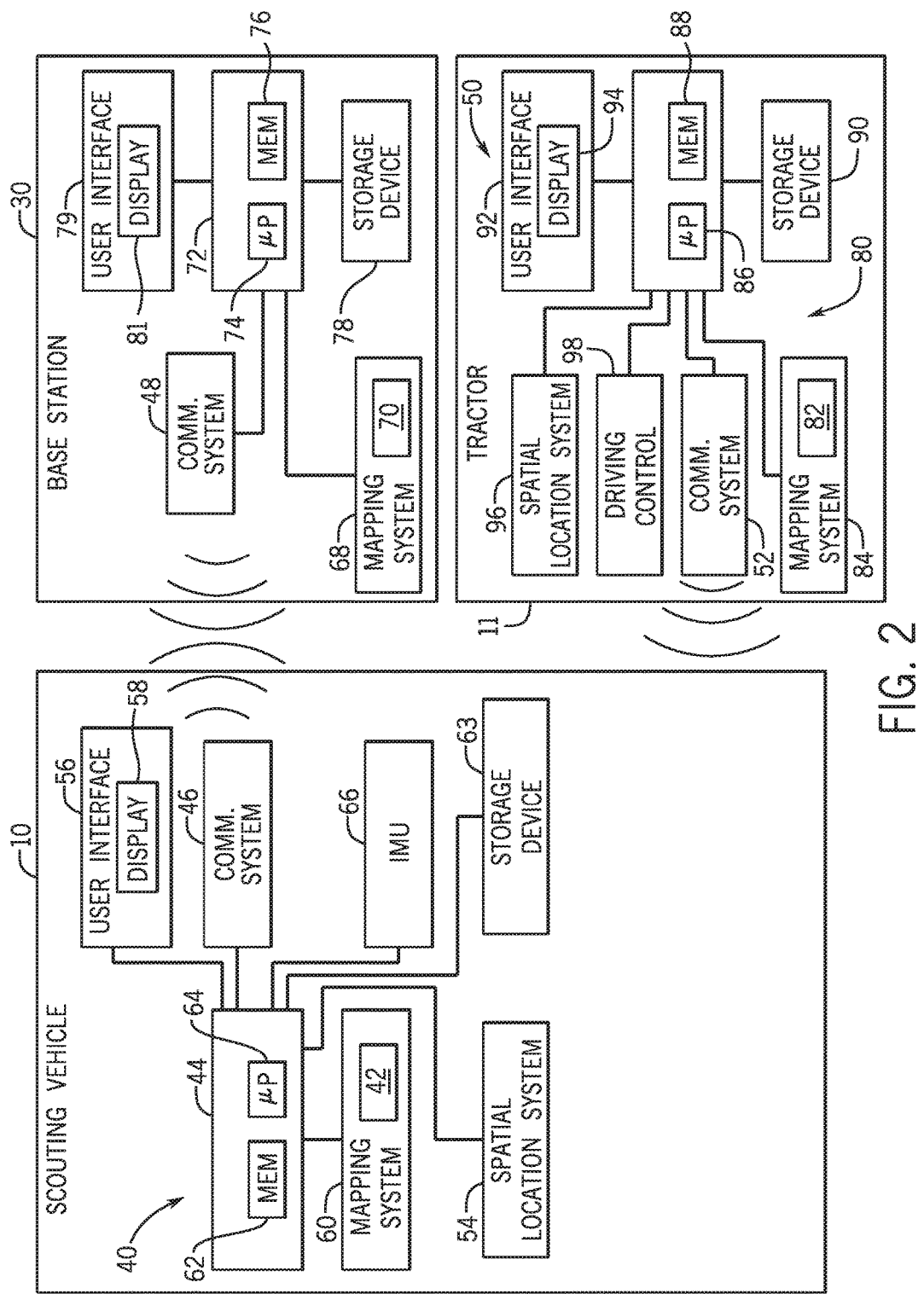
FIG. 2 is a block diagram of an embodiment of computing systems for the scouting vehicle and the agricultural vehicle of FIG. 1, and for a base station.

FIG. 2 is a schematic diagram of an embodiment of a computing system 40 included in the scouting vehicle 10 that may be utilized by the scouting vehicle 10 to provide for a map 42 of the field 14 of FIG. 1. In the illustrated embodiment, the computing system 40 includes a computing device 44 (e.g., mounted on the scouting vehicle 10). The computing device 44 may be a tablet, a laptop, a notebook, a smartphone, or other portable computing device. The computing device 44 may also be a personal computer, workstation, a carputer (e.g., car computer), and the like. Also shown is a computing system 50 suitable for autonomously driving the vehicle 11.

A first communication system 46 included in the computing system 40 is configured to establish a wireless communication link with a second communication system 48 of the base station 32. Likewise, a third communication system 52 included in the computing system 50 is also configured to establish a wireless communication link with a second communication system 48 of the base station 32. As will be appreciated, the first, second, and third communication systems 46, 48, 52 may operate at any suitable frequency range within the electromagnetic spectrum. For example, in certain embodiments, the communication systems 46, 48, 52 may include radios or transceivers that may broadcast and receive radio waves within a frequency range of about 1 GHz to about 10 GHz. In addition, the first, second, and third communication systems 46, 48, 52 may utilize any suitable communication protocol, such as a standard protocol (e.g., Wi-Fi, Bluetooth, mesh networking, etc.) or a proprietary protocol.

In the illustrated embodiment, the scouting vehicle 10 includes a spatial location system 54, which is mounted to the scouting vehicle 10 and configured to determine a geographic position of the scouting vehicle 10. As will be appreciated, the spatial location system 54 may include any suitable system configured to determine the position of the scouting vehicle 10, such as a global positioning system (GPS), for example, and/or GLONASS or other similar system. In certain embodiments, the spatial locating device 54 may additionally or alternatively be configured to determine the position of the scouting vehicle 10 relative to a fixed point within the field 14 (e.g., via a fixed radio transceiver). Accordingly, the spatial location system 54 may be configured to determine the position of the scouting vehicle 10 relative to a fixed global coordinate system (e.g., via the GPS), a fixed local coordinate system, or a combination thereof. The spatial location system 54 may additionally use real time kinematic (RTK) techniques to enhance positioning accuracy.

The computing system 40 additionally includes a user interface 56 having a display 58. The user interface 56 may receive inputs from a vehicle operator suitable for mapping the field 14, among other inputs. The display 58 may provide for textual and/or graphical visualizations suitable for mapping operations, among others, of the scouting vehicle 10. The map 42 may be created and/or modified via a mapping system 60. The mapping system 60 may include, for example, software stored in a memory 62 and executed via one or more hardware processors 64 as described in more detail below. A storage device 63 may also be provided, suitable to store digital data, for example, form the systems 46, 54, 56, 60 and/or 66, such as driving position data recordings.

The processor 64 may include multiple microprocessors, one or more "general-purpose" microprocessors, one or more special-purpose microprocessors, and/or one or more application specific integrated circuits (ASICS), or some combination thereof. For example, the processor 64 may include one or more reduced instruction set (RISC) processors. The memory 62 may include a volatile memory, such as random access memory (RAM), and/or a nonvolatile memory, such as ROM. The memory 62 may store a variety of information and may be used for various purposes. For example, the memory 62 may store processor-executable instructions (e.g., firmware or software) for the processor 64 to execute, such as instructions for the mapping system 60. The storage device 63 may include a hard drive, an optical drive, a flash drive, a solid state storage medium, or combination thereof, suitable for storing digital data, such as driving data logs.

An inertial measurement unit (IMU) 66 may also be included, which may include one or more sensors, such as specific force sensors, angular rate sensors, and/or magnetic field change sensors that may provide for the inertial measurements as the scouting vehicle 10 traverses the field 14. The IMU 66 may be used, for example, in at least two ways. One example of use is for terrain compensation which accounts for motion of the GPS 42 antenna due to scout vehicle 10 pitch and roll motions. The second example of use is through use of a dead-reckoning algorithm (e.g., executable via the processor 64 and stored in the memory 62) that verifies motion of the derived GPS position against acceleration measurements obtained via IMU 66 sensors. Dead-reckoning is used to detect GPS hops (e.g., rapid motion of the GPS position that may be caused by solar and/or atmospheric disturbances). to fine tune the position of the scout vehicle 10. Another basic use of the IMU 66 is to take a heading measurement to orient the vehicle 10 properly in the mapping software and to compensate for poor heading information from the GPS unit 42 at slow speeds or when stopped. In this manner, more accurate positioning data may be provided.

In certain embodiments, an operator may drive the scout vehicle 10 into the field 14 to create a new map 42. For example, the operator may press a button provided via the user interface 56 to begin recording mapping operations, and then drive around or "lap" the field perimeter 32. Once the drive around the field perimeter 32 is complete, the operator may press a second button provided via the user interface 56 to enable the mapping system 60 to automatically derive the field perimeter 32 shape and position via the recorded drive data. As mentioned earlier, the spatial location system 56 may be used in conjunction with the IMU 66 to derive accurate position data representative of the field perimeter 32. The field perimeter 32 may then be included in the map 42, and the map 42 may then be transmitted to the base station 30. For example, the base station may include a mapping system 68 storing a map 70. The map 70 may be updated based on the map 42. For example, once the field boundary 32 is derived via the mapping system 60, the updated map 42 may be communicated to the mapping system 68 to update the map 70.

Likewise, various field 14 features including but not limited to the pond 20, the tree stand 22, the building or other standing structure 24, and the fencing 26, may be mapped by pressing a start button, driving around their respective periphery, and subsequently pressing a stop button. The points of interest 28 may be mapped, for example, by driving near the point of interest (e.g., within 10 feet or less) and subsequently pressing a point of interest button. The point of interest 28 may then show up as an icon displayed by the mapping system 60, which may be adjusted by the operator to more properly position the point of interest's location in the map 42. The operator may also enter the point of interest 28 into the map 42 and/or 70 manually via user input. It is to be understood that every feature entered into the maps 42, 70 may be annotated, for example, to describe the feature, provide further information on the area around the feature, and the like. The mapping software also allows a user to select either side of the vehicle 10 to offset the position recording from where the GPS is physically mounted in order to more accurately reflect the shape of the area being recorded.

In certain embodiments, the first communication system 46 is configured to broadcast a signal indicative of the position of scout vehicle 10 to the second communication system 48 of the base station 30. In these embodiments, the mapping system 68 may update the map 70 based on the received signal. In some of these embodiments, only a single map, such as the map 70 may be updated and used. The updated map 70 may then be distributed, for example, via client/server techniques to the scouting vehicle's mapping system 60. The updated map 70 may also be distributed to the tractor 11 to provide for more accurate mapping data.

The mapping system 68 may include software that may be executed via a computing device 72. For example, one or more hardware processors 74 may be included in the computing device 72 suitable for executing computer instructions. For example, the processor 74 may include one or more reduced instruction set (RISC) processors. A memory 76 may include a volatile memory, such as random access memory (RAM), and/or a nonvolatile memory, such as ROM. The memory 76 may store a variety of information and may be used for various purposes. For example, the memory 76 may store processor-executable instructions (e.g., firmware or software) for the processor 74 to execute, such as instructions for the mapping system 68. A storage device 78 may include a hard drive, an optical drive, a flash drive, a solid state storage medium, or combination thereof, suitable for storing digital data, such as data logs for the base station 30. Likewise, a user interface 79 may include a display 81 used to interface with the communication systems 48, the mapping system 68, and/or the storage device 78.

Once the scouting vehicle 10 has mapped the field 14 as desired, the map 42 and/or 70 may be communicated to the tractor 11 for use in agricultural operations. As mentioned earlier, the third communication system 52 may be used to receive mapping data, for example, from the second communication system 48 (or from the first communication system 46). In the depicted embodiment, the communication system 52 is included in a computing system 80 of the tractor 11, which may then control certain tractor operations, such as driving operations. The transmitted map 70, which may then be stored as a map 82, which in turn may be processed by a mapping system 84.

To execute, for example, software included in the mapping system 84, the computing system 80 may include a hardware processor 86 and a memory 88. The processor 86 may include multiple microprocessors, one or more "general-purpose" microprocessors, one or more special-purpose microprocessors, and/or one or more application specific integrated circuits (ASICS), or some combination thereof. For example, the processor 86 may include one or more reduced instruction set (RISC) processors. The memory 88 may include a volatile memory, such as random access memory (RAM), and/or a nonvolatile memory, such as ROM. The memory 88 may store a variety of information and may be used for various purposes. For example, the memory 88 may store processor-executable instructions (e.g., firmware or software) for the processor 86 to execute, such as instructions for the mapping system 84. A storage device 90 may include a hard drive, an optical drive, a flash drive, a solid state storage medium, or combination thereof, suitable for storing digital data, such as data logs for the tractor 11. Likewise, a user interface 92 may include a display 94 used to interface with various systems of the tractor 11, such as the communication systems 52, the mapping system 84, and/or the storage device 90.

Also depicted are a spatial location system 96 and a driving control system 98. The spatial location system 98 may include any suitable system configured to determine the position of the scouting vehicle 10, such as a global positioning system (GPS), for example. In certain embodiments, the spatial locating device 98 may additionally or alternatively be configured to determine the position of the tractor 11 relative to a fixed point within the field 14 (e.g., via a fixed radio transceiver). Accordingly, the spatial location system 96 may be configured to determine the position of the off-road vehicle relative to a fixed global coordinate system (e.g., via the GPS), a fixed local coordinate system, or a combination thereof. The spatial location system 96 may additionally use real time kinematic (RTK) techniques to enhance positioning.

In operations the mapping system 84 may use the driving control system 98, the spatial location system 96, and the map 82 to autonomously drive the tractor 11. For example, the driving control system 98 may control driving operations such as steering, acceleration, braking, and other agricultural operations (e.g., planting, tilling) of the tractor 11 in the field 14. As the tractor 11 traverses the field 14, the mapping system 84 may note the features 20, 22, 24, 26 shown in FIG. 1 and maneuver accordingly. For example, the driving control system 98 may be used to steer the tractor 11 around the features 20, 22, 24, 26 during farming operations. As mentioned earlier, the mapping system 84 and/or driving control system 98 may control operations of the tractor 11 in section 34 of the field 14 while, concurrently, the scouting vehicle 10 may map the section 36 of the field 14. In this manner, more efficient farming and mapping operations may be enabled.

Figure 3:
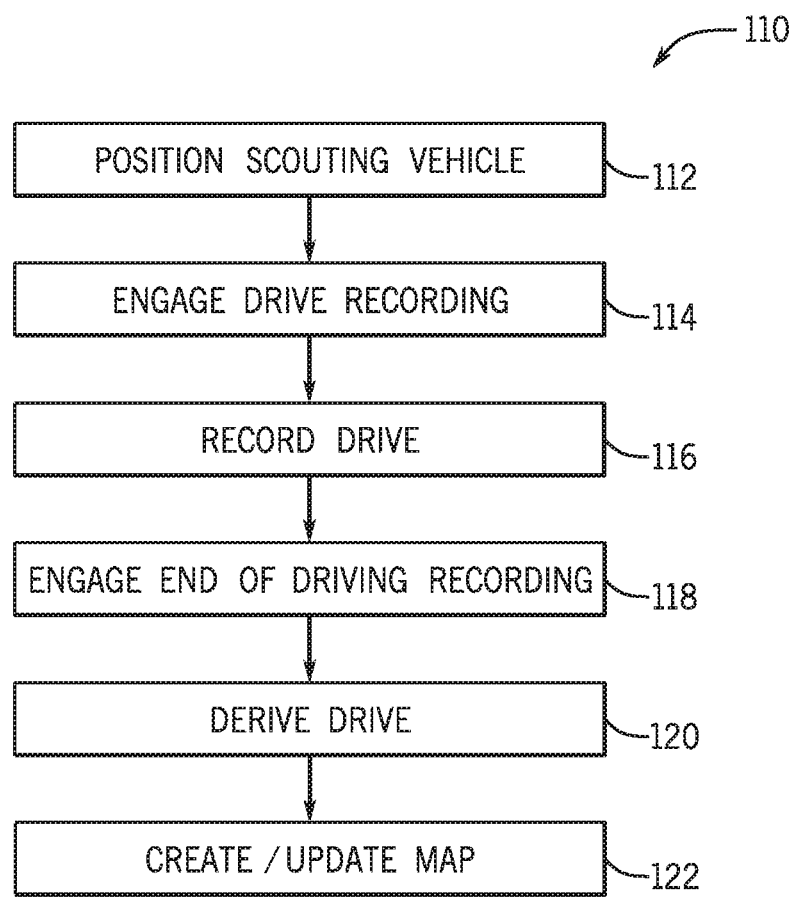
FIG. 3 is a flowchart of an embodiment of a process suitable for mapping a field via the scouting vehicle of FIG. 1.

FIG. 3 illustrates a flowchart of an embodiment of a process 110 suitable for creating and/or updating the maps 42, 70, 82. The process 110 may be implemented as computer instructions or code executable via the processors 64, 74, and/or 86 and stored in the memories 62, 76, and/or 88. In the depicted embodiment, the process 110 may position (block 112) the scouting vehicle 10 at a desired start location. For example, when mapping the field boundary 32, the scouting vehicle 10 may be positioned at a corner of the field 14. Likewise, when mapping a feature, such as the features 20, 22, 24, 26, the scouting vehicle may be first positioned (block 112) to a start location on a periphery of the feature of interest.

Once the scouting vehicle is positioned as desired, the process 110 may then engage or otherwise start (block 114) a drive recording. In one embodiment, a human operator may press a button on the user interface 56 of the scouting vehicle 10 to engage (block 114), the drive recording. The scouting vehicle 10 may then be driven around the area of interest (e.g., field boundary 32, features, 20, 22, 24, 26) and the drive may be recorded (block 116). In one embodiment, data from the spatial location system 54 is combined with IMU 66 data to create a time-based record of the scouting vehicle's position with GPS 42 antenna motion due to vehicle pitch and roll removed, and with GPS 42 hops also removed. In this manner, the scouting vehicle's complete drive around the field 14 and/or around any of the features 20, 22, 24, 26 may be recorded (block 116).

In some embodiments, positional data of the scouting vehicle's drive may be transmitted to the base station 30 at certain time intervals (e.g., every millisecond, one second, two seconds, or more) and/or at certain movement changes (e.g., every inch, every feet, every two feet of movement), and also recorded (block 116). In other embodiments, the data transmitted to the base station 30 may include the complete derive record, map shapes (e.g., shape of the field 14 and/or features 20, 222, 24, 26, and so on). It should additionally be noted that the recording (block 116) of the drive may include entering points of interest 28. For example, the scouting vehicle 10 may be stopped near the point of interest 28 and a pause button may be activated. The operator may then use the user interface 56 to enter the point of interest 28 via the mapping system 60. For example, the operator may view a visual representation of the map 42 (and the scouting vehicle 10) and enter the point of interest 28, for example, in relation to the representation of the scouting vehicle 10 in the map 42. It should also be noted that the operator may pause the drive recording at any time, and subsequently continue the recording.

Once the scouting vehicle 10 has navigated or otherwise encircled the desired area (e.g., the field 14, the features 20, 22, 24, 26), the process 110 may end (block 118) the drive recording. For example, the operator may activate a button on the user interface 56 to end (block 118) the drive recording. The process 110 may then derive (120) a shape, area, object, and so on, associated with the latest drive recording. For example, an end point derived when the drive was stopped may be combined with a start point of the drive to derive an enclosed shape, such as the field boundary 32 and/or features 20, 22, 24, 26. Open shapes may also be derived, such as sections of fencing, a ditch, and the like.

The process 110 may then create and or update (block 122) the map 42, 70, and/or 82 based on the record drive and/or derived shape. For example, a new map may be created having the field boundary 32 based on a first drive around the field 14. The new map may then be updated based on subsequent drives around the features 20, 22, 24, and/or 26. As mentioned above, the new and/or updated map 42 may then be communicated to the base station 30 (or derived by the base station 30 based on transmitted position data). The base station 30 may then provide the new and/or updated map to the tractor 11, for use in field operations.

Figure 4:
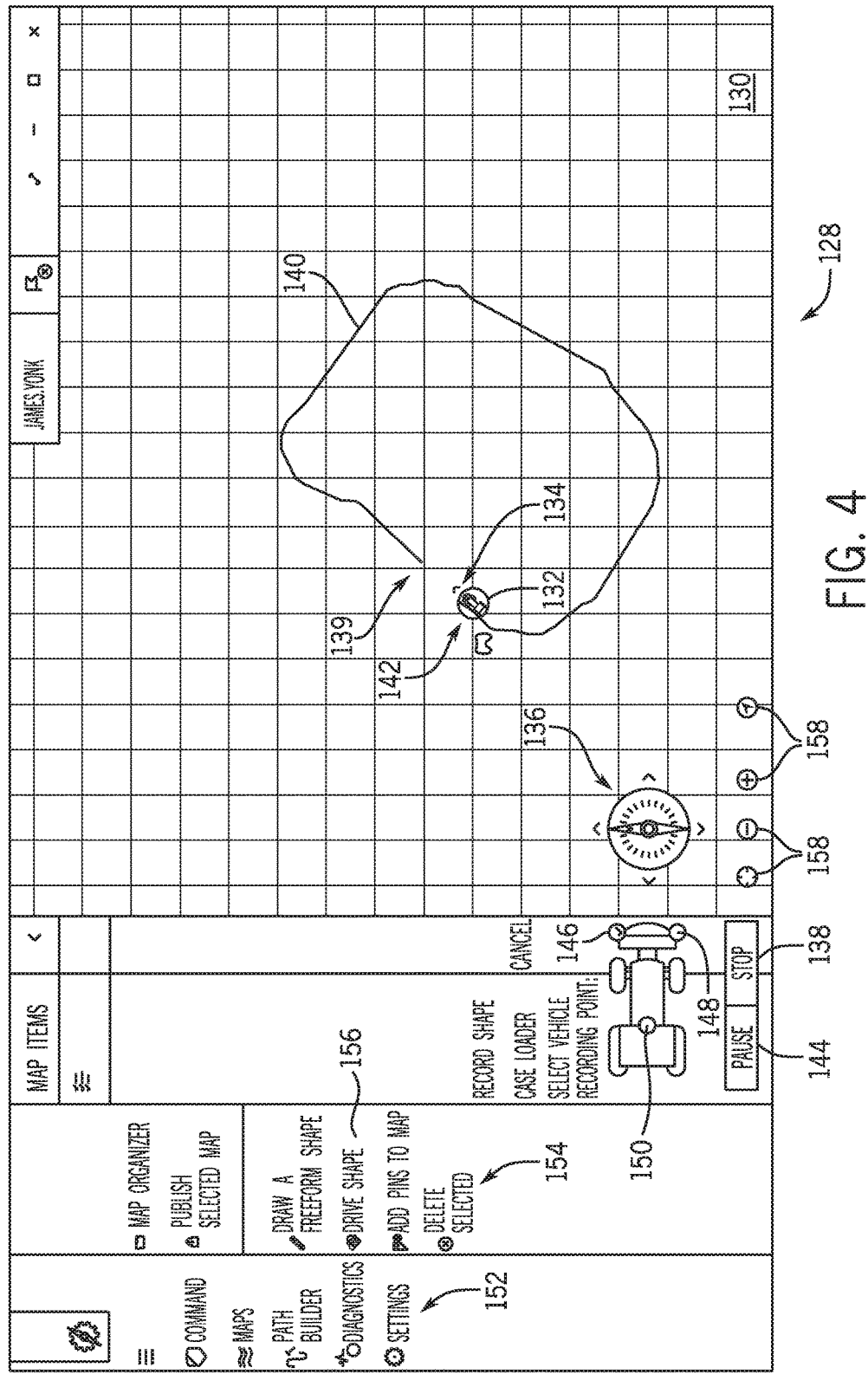
FIG. 4 is a screenshot of an embodiment of a mapping system that may be included in the scouting vehicle of FIG. 1.

Turning now to FIG. 4, the figure is a screenshot 128 of an embodiment of the mapping system 60 that may be executed, for example, by the processor 64 and stored in the memory 62. In the depicted embodiment, a screen area 130 is provided, representative of a geographic area where the scouting vehicle 10 is located. Accordingly, the scouting vehicle 10 is represented by a graphic or icon 132. An arrow 134 depicts a direction of motion for the scouting vehicle 10. Also shown is a compass 136, which may representative of either magnetic north or true north. In use, the screenshot 128 may be presented via the display 58 included in the scouting vehicle 10.

As mentioned earlier, the operator of the scouting vehicle 10 may position the scouting vehicle as desired to start mapping operations. When ready to map, the operator may activate a control 138, for example via a touch screen, a mouse, a joystick, or other input device, and the mapping system 60 may thus being recording driving positions of the scouting vehicle 10. A start position 139 is illustrated showing a location where the drive recording was first started. In the depicted embodiment, the control 138 may change a label from "start" to "stop" once the control 138 is activated.

The operator may then drive the scouting vehicle 10 around a desired area, such as the field 14, and/or features 20, 22, 24, 26. The mapping system 60 may then continuously draw a shape 140 representative of the desired area as the area is driven. Once the drive is complete, the operator may activate the control 138 again and stop the drive recording at end position 142. As mentioned earlier, pausing the drive recording may be enabled, for example, by activating a control 144, and subsequently restarted. Once the drive recording is stopped, the mapping system 60 may complete the shape 140, for example by adding a line between the points 142 and 139. The operator may then instruct the mapping system 60 of the type of feature or boundary was being mapped, annotate the map, and so on.

The scouting vehicle 10 may include multiple position recording points, such as points on either side of the scouting vehicle 10 as well as a center of the scouting vehicle 10. Accordingly, the operator may select one of various recording points 146, 148, 150 to use when recording the drive. In certain embodiments, the port and starboard recording points 146, 148, are used to map features that cannot be driven over (e.g. fence lines, trees, holes, etc.). The central recording point 150 may be used for features that may be driven over and/or straddled (e.g. open field boundaries, water-way boundaries, etc.). Additionally or alternatively, the port side recording point 146 may more accurately be used in mapping shapes that may include left turns, while the starboard side recording point 148 may more accurately be used in mapping shapes that may include right turns. The center recording point 150 may be used in shapes with straight-aways. In certain embodiments, the recording points may be switched by the operator during the drive to more accurately record a desired shape, such as the shape 140. For example, during straight-aways, the recording point 150 may be selected, and then, based on certain turns, the recording pints 146 and/or 148 may be selected. In this manner, a more accurate position of the desired recording shape may be achieved.

A menu 152 and a submenu 152 are also provided, suitable to navigate through various options of the mapping system 60. In the depicted embodiment, a drive shape submenu 156 is selected, useful in creating the shape 140 via the aforementioned recording drive. Other controls 158 are also provided, suitable to zoom in and out of the area 130, center the area 130, and so on. In one exemplary embodiment, the mapping system 60 having the screenshot 128 is a Mobius system, available from Autonomous Solutions, Inc., of Mendon, Utah, United States of America.

Figure 5:
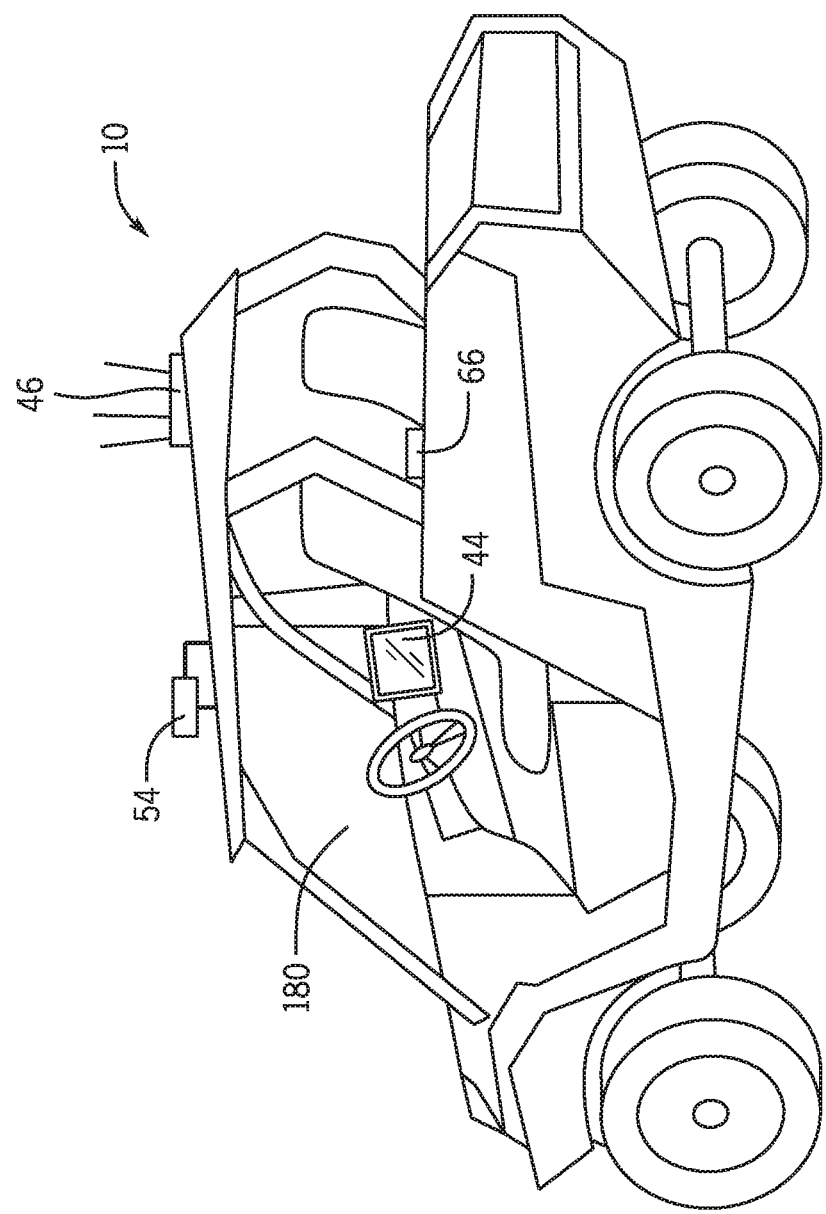
FIG. 5 is a perspective view of an exemplary embodiment of the scouting vehicle of FIG. 1.

While a variety of vehicle platforms may be used for the scouting vehicle 10, it may be useful to illustrate an exemplary embodiment. Accordingly, FIG. 5 is a perspective view showing an exemplary embodiment of the scouting vehicle 10. In the illustrated embodiment, the scouting vehicle 10 is an off road vehicle suitable for navigating a variety of field conditions. In certain embodiments, the scouting vehicle 10 may be a gasoline powered 4×4 utility vehicle. As depicted, the scouting vehicle includes a cab 180 suitable for use by a human operator. In use, the human operator would enter the cab 180, verify operations of various systems of the scouting vehicle 10, and then proceed to drive the scouting vehicle 10 to map the field 14 as described earlier.

As shown, antennas and various other components of the communication system 46 are mounted on a top portion of the cab 180. Also mounted on the top portion is the spatial location system 54. The top mount enables less interference with operations of the systems 46, 54, such as transmittal and receipt of data. The computing device 44 (e.g., tablet) may be mounted inside of the cab 180 within easy access by the vehicle operator. The operator may comfortably drive the scouting vehicle 10 while accessing the computing device 44, for example, to start/stop drive records, enter annotations, enter points of interest, and the like. The IMU 66 may also be mounted inside of the cab 180. As mentioned earlier, the IMU 66 may provide for enhanced positional accuracy. By providing for the scouting vehicle 10 and the various systems included therein, the techniques described herein enable a more effective and accurate mapping, suitable for use during tractor 11 operations.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A system, comprising: a scouting vehicle comprising:
   a spatial location system configured to derive a geographic position of the scouting vehicle;
   a computing device communicatively coupled to the spatial location system and to a communication system, the computing device comprising a processor configured to create a shape on a map based on a recording of a drive of the scouting vehicle, wherein the processor is configured to display an icon representative of the scouting vehicle and to enable a user to select one or more recording points to record the drive by selecting vehicle recording points via the icon; and
   the communication system configured to transmit to a base station; and
the base station comprising:
   a base station memory configured to store a base station map; a base station processor; and
   a base station communication systems configured to communicate with the communication system of the scouting vehicle, wherein the base station processor is configured to;
   load an existing base station map from a storage device into the memory as the base station map;

update a portion of the base station map to create an updated base station map based on the shape communicated by the scouting vehicle; and
save the updated base station map into the storage device.

2. The system of claim 1, wherein the scouting vehicle comprises an inertial measurement unit (IMU) configured to filter "jumps" in the geographic position via at least one inertial measurement.

3. The system of claim 1, wherein the processor is configured to display the icon representative of the scouting vehicle and position the icon on a position in the map representative of the geographic position of the scouting vehicle.

4. The system of claim 3, wherein the processor is configured to display both the shape and the icon on the map.

5. The system of claim 1, wherein the processor is configured to display a start control and a stop control on a display, wherein the start control is configured to begin the recording of the drive when activated and wherein the stop control is configured to end recording of the drive when activated.

6. The system of claim 5, wherein the processor is configured to display a pause control on the display, and wherein the pause control is configured to pause the recording of the drive when activated.

7. The system of claim 1, wherein the base station processor is configured to update the portion of the base station map by adding a field boundary, a field feature, or a combination thereof, to the portion of the base station map.

8. The system of claim 1, wherein the base station is configured to communicate with an autonomous vehicle, a manned vehicle, or a combination thereof, the updated base station map to update a vehicle map of the autonomous vehicle, the manned vehicle, or the combination thereof.

9. The system of claim 8, comprising the autonomous vehicle, the manned vehicle, or the combination thereof, wherein the autonomous vehicle, the manned vehicle, or the combination thereof is configured to perform agricultural operations on a first section of a field while the processor is configured to create the shape on the map while the scouting vehicle is operating on a second section of the field.

10. A non-transitory, computer readable medium comprising instructions that when executed by a processor cause the processor to:
present a start control on a display;
present a stop control on the display;
display an icon representative of a scouting vehicle;
enable a user to select one or more recording points to record a plurality of positions of the scouting vehicle by selecting vehicle recording points via the icon;
start recording a drive of the scouting vehicle when the start control is activated in the scouting vehicle;
continuously record the plurality of positions of the scouting vehicle as the scouting vehicle is driven around an area;
display the plurality of positions as a shape on a map in the display;
stop recording of the drive when a stop control is activated in the scouting vehicle;
transmit the shape to a base station;
load an existing base station map from a storage device into a memory of the base station as a base station map;
update a portion of the base station map to create an updated base station map based on the shape; and
save the updated base station map into the storage device.

11. The non-transitory, computer readable medium of claim 10, comprising instructions that when executed by the processor, cause the processor to update the portion of the base station by adding a field boundary, a field feature, or a combination thereof, to the portion of the base station map.

12. The non-transitory, computer readable medium claim 11, comprising instructions that when executed by the processor, cause the processor to update a vehicle map included in an autonomous vehicle, a manned vehicle, or a combination thereof, based on the update of the base station map.

13. The non-transitory, computer readable medium of claim 10, comprising instructions that when executed by the processor, cause the processor to present a pause control on the display, and pause the recording of the plurality of positions when the pause control is activated.

14. The non-transitory, computer readable medium of claim 10, comprising instructions that when executed by the processor, cause the processor to select a port side recording point, a center recording point, a starboard side recording point, or a combination thereof, to record at least one of the plurality of positions of the scouting vehicle.

15. The non-transitory, computer readable medium of claim 10, comprising instructions that when executed by the processor, cause the processor to use inertial measurement unit (IMU) data to verify at least one of the plurality of positions.

16. A method, comprising:
presenting a start control on a display;
presenting a stop control on the display;
displaying an icon representative of a scouting vehicle;
enabling a user to select one or more recording points to record a plurality of positions of the scouting vehicle by selecting vehicle recording points via the icon;
starting a recording of a drive of the scouting vehicle when the start control is activated in the scouting vehicle;
continuously recording the plurality of positions of the scouting vehicle as the scouting vehicle is driven around an area;
displaying the plurality of positions as a shape on a map in the display;
stopping the recording of the drive when a stop control is activated in the scouting vehicle; transmitting the shape;
loading an existing base station map from a storage device into a memory of the base station as a base station map;
updating a portion of the base station map to create an updated base station map based on the shape; and
saving the updated base station map into the storage device.

17. The method of claim 16, wherein updating the portion of the base station map comprises adding a field boundary, a field feature, or a combination thereof, to the portion of the base station map.

18. The method of claim 17, comprising updating a vehicle map included in an autonomous vehicle, a manned vehicle, or a combination thereof, based on the updating of the base station map.

19. The method of claim 16, comprising selecting a port side recording point, a center recording point, a starboard side recording point, or a combination thereof, to record at least one of the plurality of positions of the scouting vehicle.

20. The method of claim 16, comprising inertial measurement unit (IMU) data to verify at least one of the plurality of positions.

* * * * *